United States Patent [19]
Gilliam

[11] Patent Number: 5,753,800
[45] Date of Patent: May 19, 1998

[54] SMOKE GENERATING APPARATUS FOR IN SITU EXHAUST LEAK DETECTION

[76] Inventor: Leslie Gilliam, 93 Bayou Vista Dr., Hitchcock, Tex. 77563

[21] Appl. No.: 784,779

[22] Filed: Jan. 16, 1997

[51] Int. Cl.⁶ ............................ G01M 3/20; B01F 3/02
[52] U.S. Cl. ...................... 73/40.7; 73/49.7; 73/46
[58] Field of Search .................... 73/40.7, 40, 49.7, 73/46

[56] References Cited

U.S. PATENT DOCUMENTS

| | | | |
|---|---|---|---|
| 3,250,723 | 5/1966 | Fortney | 252/305 |
| 3,395,514 | 8/1968 | Bub | 55/97 |
| 3,444,721 | 5/1969 | Hearn et al. | 73/23 |
| 3,451,259 | 6/1969 | McNutty | 73/40.5 |
| 3,459,230 | 8/1969 | Smith | 138/93 |
| 3,852,996 | 12/1974 | Klaubert et al. | 73/40.5 R |
| 3,870,085 | 3/1975 | Schneider | 138/93 |
| 4,155,249 | 5/1979 | Scott | 73/40.7 |
| 4,198,856 | 4/1980 | Kasellaan et al. | 73/40.7 |
| 4,330,428 | 5/1982 | Clifford | 252/359 CG |
| 4,667,507 | 5/1987 | Eriksson | 73/49.7 |
| 4,694,695 | 9/1987 | Sewell et al. | 73/40.5 R |
| 4,976,136 | 12/1990 | Willan | 73/40.7 |
| 5,029,614 | 7/1991 | Lara et al. | 138/90 |
| 5,107,698 | 4/1992 | Gilliam | 73/40.7 |
| 5,168,747 | 12/1992 | Weaver et al. | 73/40.7 |
| 5,335,536 | 8/1994 | Runnevik | 73/40.7 |
| 5,362,568 | 11/1994 | Dietz et al. | 428/421 |
| 5,372,036 | 12/1994 | Kainz | 73/117.3 |

FOREIGN PATENT DOCUMENTS

714332  7/1965  Canada .................... 116/68

*Primary Examiner*—Michael Brock
*Assistant Examiner*—J. David Wiggins
*Attorney, Agent, or Firm*—Harrison & Egbert

[57] ABSTRACT

An apparatus for in situ testing an exhaust system of a conventional internal combustion engine safely, via electrical heater, generating smoke from a smoke-generating fluid contained within a chamber, and then communicating such smoke through the tailpipe components comprising conventional exhaust systems such as tailpipes, clamps, gaskets, hangers, welds, and flanges. By observing smoke emanating from any of the plurality of pipes and associated connections in an exhaust system, any and all leaks therein may be identified and precisely located. The apparatus includes a tapered preferably frustoconically-shaped play which is sealably received into the tailpipe of a vehicle being tested for exhaust leaks.

27 Claims, 7 Drawing Sheets

SMOKE GENERATING APPARATUS FOR IN SITU EXHAUST LEAK DETECTION

BACKGROUND OF THE INVENTION

This invention relates to leak detection methods and apparatus for diagnostic purposes, and more particularly relates to methods and means for locating leaks in any exhaust system in the internal combustion engine.

It is well known in the prior art that an automobile cooling system is intended to be a closed system which enables heat transfer from an operating engine to cooling water and the like, circulated by a water pump to the radiator which, in turn, transfers heat from the water to the atmosphere. A leak in the cooling system, typically occurring in either a hose, in a clamp, or in the walls of the radiator, significantly reduces heat transfer efficiency and may cause overheating of, and possible damage to, the internal combustion engine.

It is also well known in the prior art that the internal combustion engine commonly used in automobiles and trucks contains several exhaust connections which are sealed with flanges and gaskets. If a leak occurs in any of these connections, the operating efficiency of the internal combustion engine is again significantly reduced. Indeed, exhaust gas leakage into the ambient and invasion of ambient air into the exhaust system are common operational problems. As will be appreciated by those skilled in the art, exhaust leaks, unfortunately, are frequently even found in newer cars.

Notwithstanding this prevalence of exhaust leaks, exhaust leaks in the internal combustion engine are difficult to find because the exhaust system has multiple layers of connections including gaskets, clamps and flanges. To find such exhaust leaks practitioners attempted to use electronic diagnostic devices or trace gases. As will be appreciated by those skilled in the art, only limited success has been achieved with these devices and approaches, particularly without extensive checking and re-checking of suspect automobiles and the like. As will also be appreciated by those skilled in the art, many vehicles having computer-control of internal combustion engine operations typically and ironically attempt to compensate for such exhaust leaks and the like, instead of diagnosing and suggesting repairs for such leaks.

There have been many attempts in the, prior art to provide leak detection means and methods for specific portions of a closed system in the internal combustion engine, but there have been few improvements focusing on leak detection for an entire exhaust system. For example, Klaubert, in U.S. Pat. No. 3,852,996, discloses a device for quantitatively determining leaks in any constant mass input fluid flow system such as an automobile engine exhaust system by measuring the pressure drops across a pair of different sized orifices contained in a flow-meter located at the exit portion of the exhaust system, i.e., at the tailpipe. The ratio of the pressure drops is obtained and then the measured values are calibrated with specific orifice-pair parameters to determine the effective size of a single round hole which would leak an amount of exhaust equivalent to the total mass flow rate of leakage from all holes which may actually exist in an exhaust system. This equivalent leakage flow rate is determined regardless of hole size, shape, number, and location. Obviously, the Klaubert device, while seeking the presence of an exhaust leak, fails to show exhaust leak location.

As another example of developments in the art, in U.S. Pat. No 5,372,036, Kainz teaches an electronic method of exhaust leak detection of an operating engine which detects leaks from the engine exhaust of an internal combustion engine using operating parameters. More particularly, signals from an exhaust gas oxygen sensor downstream of a catalyst indicates a leak if these signals are smaller than a predetermined constant. Similarly, this electronic method of leak detection indicates only that an exhaust leak exists, but fails to isolate the location of the leaks.

Similarly, Tate, in Canadian Pat. No 714332, teaches a method using a dash-mounted warning light connected electrically to a switch, in turn, mounted in the exhaust stream thereby indicating the presence of an exhaust leak. Again, the location and size of leaks present remain unknown to an operator or mechanic.

Thus, as hereinbefore exemplified, in spite of practitioners in the art attempting to improve the means for diagnosing leaks in the exhaust system inherent in the internal combustion engine, there has apparently been minimal effort to detect the exact location of such leaks. With modern demands imposed upon the performance of such engines—necessitating lower compression ratios, using leaner fuel mixtures, and compliance with emission control standards of the United States Environmental Protection Agency—the safety of passengers riding in automobiles and the like having small or even minute vacuum leaks, exhaust leaks, etc., not to mention operational performance, is apt to be compromised. Accordingly, improvements in the art are critically needed.

U.S. Pat. No. 4,667,507, granted to Eriksson, illustrates an attempt to improve the detection art relative to small leakages caused by correspondingly small defects and the like in the cylinder head gasket and the engine block. While providing a means for detecting compression leaks during the operation of an internal combustion engine, this device fails to detect other leaks including exhaust leaks.

In U.S. Pat. No. 5,107,698, the instant inventor, teaches the application of smoke-detection technology to diagnose the precise location of leaks in a vacuum system integral to the internal combustion engine. More particularly, an apparatus and method are disclosed for in situ testing for the existence and location of vacuum leaks by using a chambered smoke-generating fluid which safely permeates an automotive vacuum system and the like. By visually observing smoke emanating from any hoses, flanges, or gaskets contained within the vacuum system, leaks may be precisely located. The application of such smoke-detection art to test for exhaust leaks in an internal combustion engine would provide a heretofore unknown vehicle for expeditiously and reliably assessing the integrity of the exhaust system. The availability of such a procedure, of course, would not only promote the longevity and operational efficiency of internal combustion engines, but also would promote the safety of passengers and the integrity of the environment.

Accordingly, these limitations and disadvantages of the prior art are overcome with the present invention, and improved means and techniques are provided which are useful for using smoke for detecting the location of leaks in exhaust systems contained in internal combustion engines in automobiles and the like.

SUMMARY OF THE INVENTION

The present invention provides an apparatus for in situ leak-testing of an exhaust system of a conventional internal combustion engine. The apparatus includes means for safely generating smoke from a smoke-generating fluid contained within chamber means, and then communicating such smoke through the tailpipe and into the panoply of connecting and sealing means comprising conventional exhaust systems. By observing smoke emanating from any of the plurality of pipes, flanges, gaskets, and clamps characterizing these various connecting and sealing means in the exhaust system, any and all leaks therein may be identified and precisely located. The apparatus taught by the present invention includes a tapered insertion means which is sealably received into the tailpipe of a vehicle being tested for exhaust leaks.

In accordance with the present invention, the location of leaks of any and all sizes, regardless of their location in the plurality of interconnecting presumably sealed pipes and joints contained throughout the exhaust system of modern internal combustion engines, are reliably and, indeed, routinely identified. Thus, an apparatus heretofore unknown in the art is provided which enables convenient, inexpensive, and reliable exhaust leak detection in internal combustion engines.

As will be hereinafter described in detail, it is a particular advantage of the present invention that smoke which is sealably communicated to the exhaust system in an internal combustion engine visibly identifies the precise location of any leaks contained therein. Even minute cracks and the like existing in pipes, flanges, gaskets, and clamps will issue tell-tale smoke therefrom. Accordingly, it is a distinct advantage of the present invention that exhaust leaks may be identified and then remedied at an early stage of derogation to an engine's operational efficiency. This, of course, prevents or at least minimizes polluting the environment and concomitant health hazards to passengers and even innocent by-standers.

As should be appreciated by those skilled in the art, exhaust leaks significantly contribute to inefficiently operating internal combustion engines and problems therewith. It is accordingly an object of the present invention to provide an apparatus for determining the existence of exhaust leaks in situ in internal combustion engines.

It is also an object of the present invention to provide a method and apparatus for determining-leaks in internal combustion engines without requiring any change of, or addition to, standard factory equipment.

It is a further object of the present invention to provide an apparatus and method for determine the existence of exhaust leaks in automobile engines and the like without applying elevated pressures thereto, thereby avoiding the risk of damage.

It is another feature and advantage of the present invention that exhaust leaks may be detected in internal combustion engines with a reliability and convenience heretofore unknown in the prior art. It is accordingly an object of the present invention to provide means for expeditiously determining the location of any and all leaks in the exhaust system of an internal combustion engine.

It is also an object and feature of the present invention that an apparatus is provided to enable those skilled in the art to ascertain the presence of leaks in virtually any closed exhaust system in the automobile and the like.

It is a specific object of the present invention to provide, an apparatus for detecting, with a smoke-generating fluid, leaks in an exhaust system contained in a vehicle powered by an internal combustion engine having a plurality of pipes including a tailpipe, flanges, gaskets, and clamps, and further having an energizing battery, said apparatus comprising: chamber means for containing said smoke-generating fluid; said chamber means including port means for pouring said smoke-generating fluid and circulation means for circulating said smoke-generating fluid therein; switch means fixedly attached to an internal surface of said chamber means and electrically coupled to said battery, for starting and stopping the operation of said apparatus; heating means fixedly attached to an internal surface of said chamber means and electrically coupled to said switch means and responsive thereto, for vaporizing said smoke-generating fluid into smoke; temperature regulating means fixedly attached to an internal wall of said chamber means and electrically coupled to said heating means, for regulating the operation of said heating means; pressure regulating means fixedly attached to said chamber means for regulating the pressure of said smoke within said chamber means; and conduit means fixedly attached to said chamber means and configured to sealingly communicate said smoke to said exhaust system through a hollow tapered insertion means adjoined to said tailpipe for visibly detecting said exhaust leaks by smoke exiting therefrom into the atmosphere.

It is another specific object of the present invention to provide, an apparatus for detecting, with a smoke generating fluid, leaks in an exhaust system contained in a vehicle powered by an internal combustion engine having a plurality of pipes including an exhaust pipe, gaskets, flanges and clamps and further having an energizing battery, said apparatus comprising; chamber means for containing said smoke-generating fluid; said chamber means comprising port means for pouring said smoke-generating fluid, pump means for circulating said smoke-generating fluid therein, and illumination means for indicating that heating is in progress; fluid flow regulating means fixedly attached to an internal wall of said chamber means, for preventing the inadvertent flow of said smoke-generating fluid through said conduit means; switch means fixedly attached to an internal surface of said chamber means and electrically coupled to said battery, for starting and stopping the operation of said apparatus; spike protection means fixedly attached to an internal wall of said chamber means and electrically coupled to said battery, for preventing voltage surges from damaging said internal combustion engine; said illumination means electrically coupled to said switch means with thermistor means, and activated when a predetermined temperature is reached in said thermistor means; heating means fixedly attached to an internal surface of said chamber means and electrically coupled to said switch means and responsive thereto, for vaporizing said smoke-generating fluid into smoke; said heating means partially immersed in said smoke-generating fluid within said chamber means to enable vaporization thereof into said smoke by said smoke-generating fluid contacting the un-immersed portion of said heating means; temperature regulating means fixedly attached to an internal wall of said chamber means and electrically coupled to said heating means, for regulating the operation of said heating means; pressure regulating means fixedly attached to said chamber means for regulating the pressure of said smoke within said chamber means; and conduit means fixedly attached to said chamber means and configured to sealingly communicate said smoke to said exhaust system through a hose means disposed axially within a hollow tapered insertion means and sealably interconnected with said tailpipe and said conduit means; said hollow tapered insertion means adjoined to said tailpipe for visibly detecting said exhaust leaks by smoke exiting therefrom into the atmosphere; with said conduit means including spark-arrestor regulating means for preventing inadvertent ignition in said internal combustion engine.

These and other objects and features of the present invention will become apparent from the following detailed description, wherein reference is made to the figures in the accompanying drawings.

DETAILED DESCRIPTION

Figure 1:
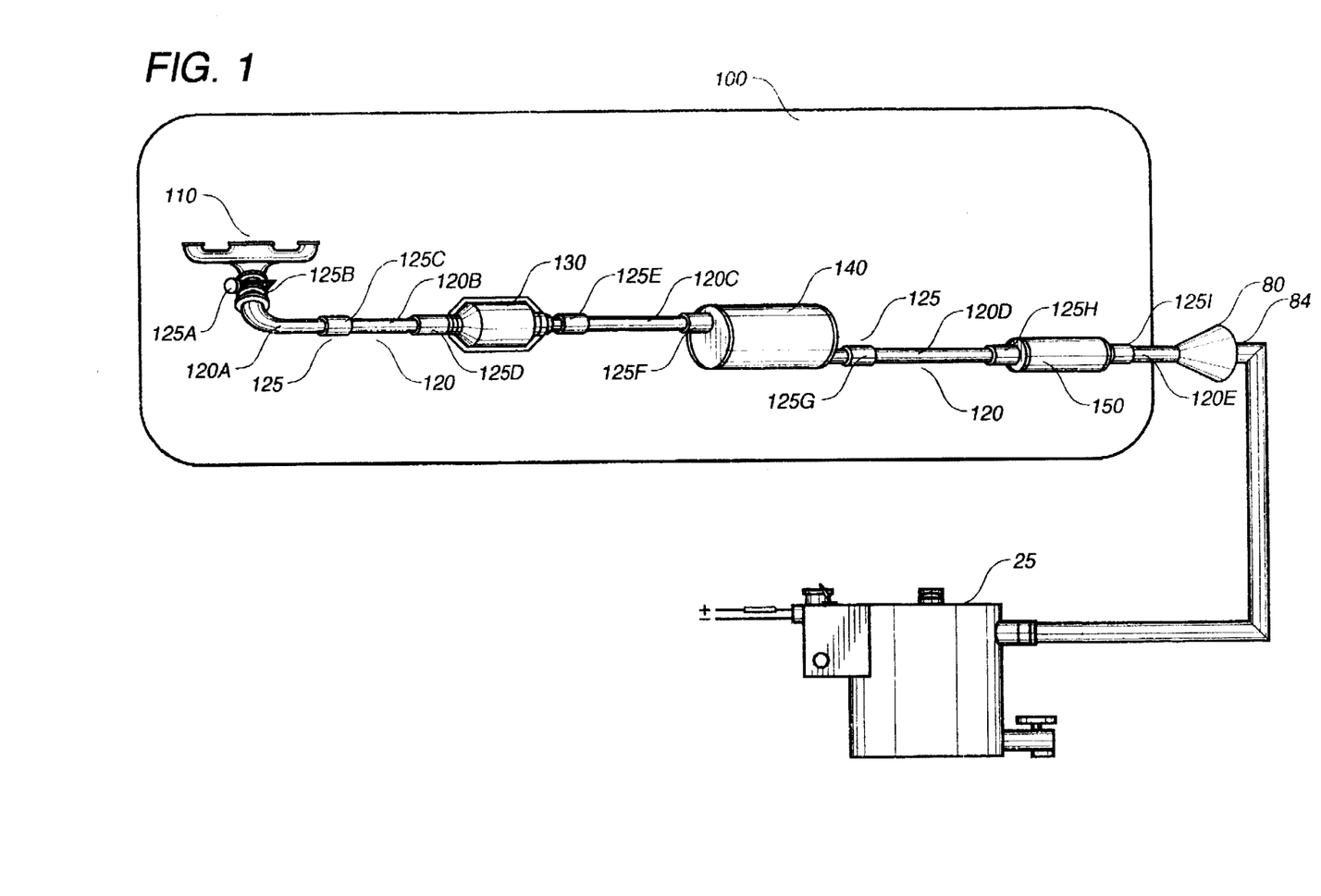
FIG. 1 depicts a frontal perspective view of a simplified exhaust system of an internal combustion engine interconnected with an apparatus embodying the present invention.
Figure 2:
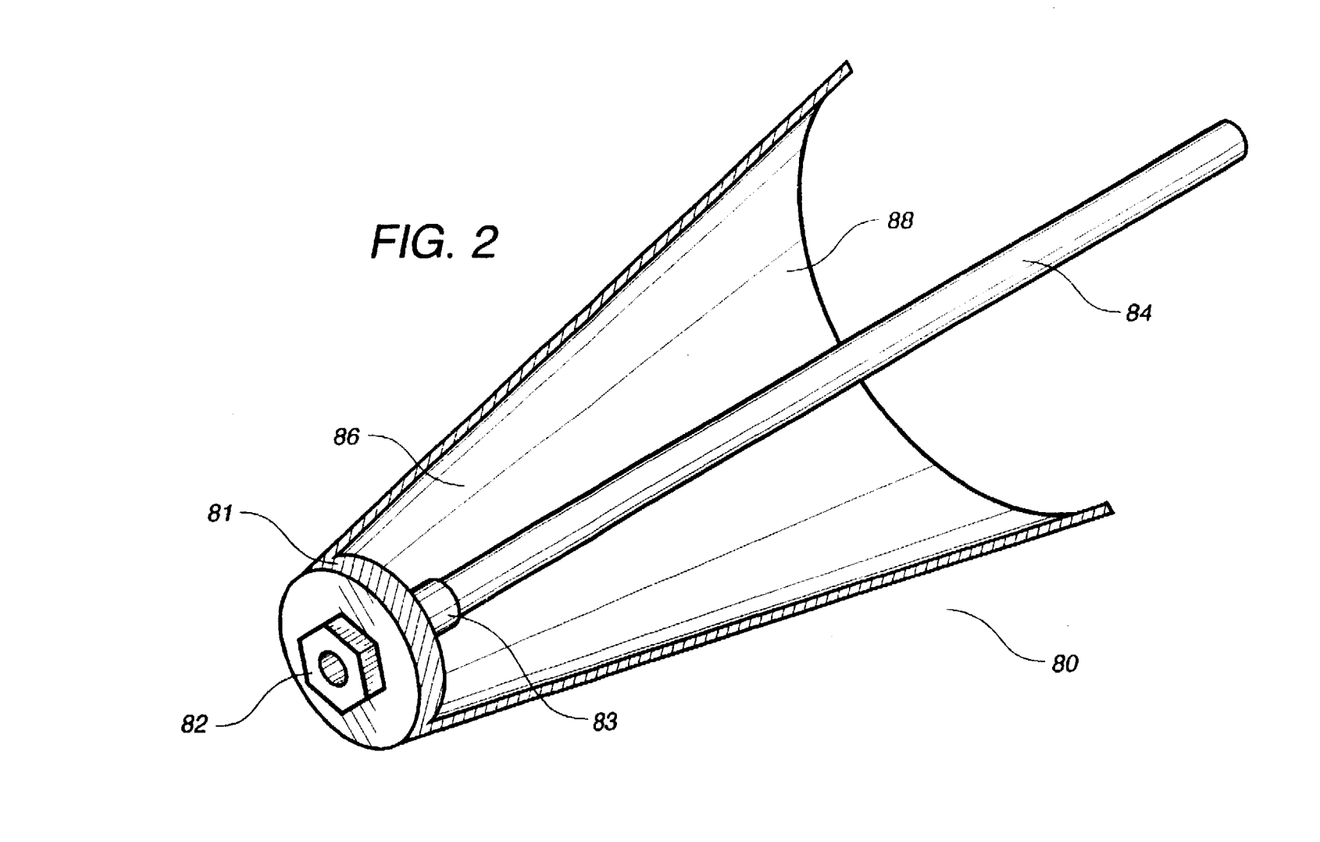
FIG. 2 depicts a frontal perspective cut-away view of a portion of the apparatus depicted in FIG. 1.
Figure 3:
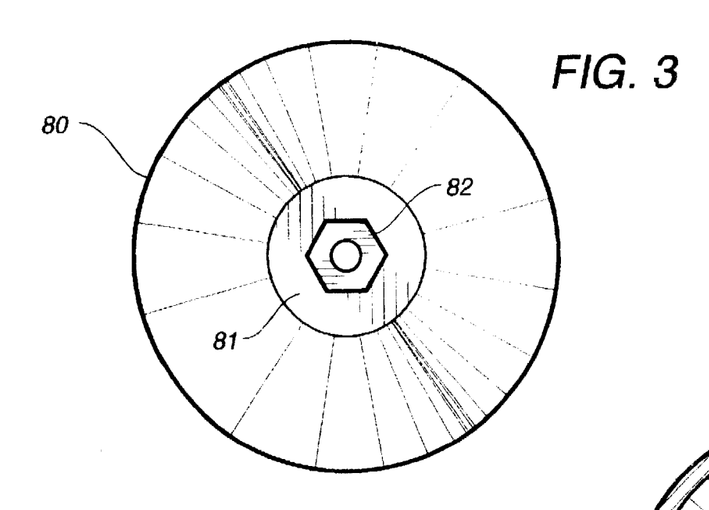
FIG. 3 depicts a left end view of the portion of the apparatus depicted in FIG. 2.
Figure 4:
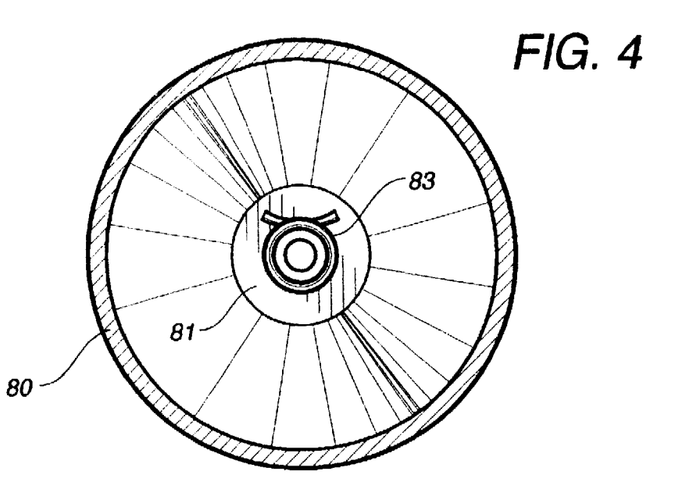
FIG. 4 depicts a right end view of the apparatus depicted in FIG. 3.

Referring to FIG. 1, there is depicted a frontal perspective view of a simplified exhaust system of an internal combustion engine interconnected with a smoke-generating, exhaust leak detection apparatus embodying the present invention. As will be readily understood by practitioners in the art, there are several possible points of leakage for a typical exhaust system depicted by numeral 100 including exhaust manifold 110, catalytic converter 130, muffler 140, and, of course, plurality of pipe or conduit means 120 and corresponding plurality of interconnection means 125 therebetween. Also depicted is resonator 150 which optionally is included in automobiles and the like, between muffler 140 and exhaust pipe 120E, to supplement the normal noise-suppression provided by muffler 140. As will be appreciated by those skilled in the art, exhaust system 100 includes a plurality of interconnection means 125 including gaskets, couplings, seals, clamps, hangers, and flanges are designed to sustain the ability of the system to confine exhaust fumes contained therein.

In a manner well known in the art, hot exhaust gases are routed from a conventional internal combustion engine to the rear of an automobile chassis and the like through its exhaust system. Thus, still referring to FIG. 1, these exhaust gases travel from the engine cylinders (not shown) into exhaust manifold 110 and then through plurality of pipe or conduit means 120 in combination with corresponding plurality of interconnection means 125 and ultimately are discharged into the ambient. As will be hereinafter described, plurality of pipe or conduit means 120 comprises front or engine pipe means 120A, intermediate pipe means 120B, rear pipe means 120C, resonator pipe means 120D, and exhaust pipe means 120E; similarly, plurality of connectors 125 comprises connectors 125 A–L Exhaust manifold 110 is generally affixed to the adjacent engine with gasket 112 therebetween, and is adjoined to front pipe means 120A with flange connector 125A of plurality of interconnection means 125. Front pipe means 120A and intermediate pipe means 120B are preferably adjoined by slip connector 125C. Intermediate pipe means 120B is affixed to catalytic converter 130 with catalytic converter receptacle or coupling 125D. Rear pipe means 120C interconnects catalytic converter 130 at receptacle or coupling 125E with muffler 140 with muffler receptacle or coupling 125F. Resonator pipe means 120D interconnects muffler 140 and optional resonator 150; and then exhaust pipe portion 120E interconnects resonator 150 and tapered insertion means 80, as will be hereinafter described in detail. Of course, it will be readily understood that if an exhaust system is constructed without a resonator, then exhaust pipe portion 120D directly interconnects muffler 140 with tapered insertion means 80. It is common in the art for plurality of connectors 125A–I to be secured with clamps and the like to prevent exhaust gas leaks emanating therefrom.

It will be appreciated by those skilled in the art that exhaust system 100 includes a plurality of connection points which are vulnerable to cause leakage of exhaust gas. Flexible connector 125A is designed to accommodate independent movement of the internal combustion engine during acceleration and the like. To promote the integrity of the seal, between flexible connector 125A and engine pipe means 120A, flange gasket 125B is typically used. Connector 125C is typically a "slip connector" which enables engine pipe means 120A and intermediate pipe means 120B to be sealably and axially joined and then be secured together using a clamp means affixed thereon (not shown). Similarly, preferably slip-connector 125D enables intermediate pipe means 120B and catalytic converter 130 to be sealably and axially joined and then be secured together using a clamp means affixed thereon (not shown); preferably slip-connector 125E enables exhaust pipe portion 120C and catalytic converter 130 to be sealably and axially joined and then be secured together using a clamp means affixed thereon (not shown); preferably slip-connector 125F enables exhaust pipe portion 120C and muffler 140 to be sealably and axially joined and then be secured together using a clamp means affixed thereon (not shown); preferably slip-connector 125G enables exhaust pipe portion 120D and muffler 140 to be sealably and axially joined and then be secured together using a clamp means affixed thereon (not shown); preferably slip-connector 125H enables exhaust pipe portion 120D and resonator 150 to be sealably and axially joined and then be secured together using a clamp means affixed thereon (not shown); and preferably slip-connector 125I enables exhaust pipe portion 120E and resonator 150 to be sealably and axially joined and then be secured together using a clamp means affixed thereon (not shown).

According to the teachings of the present invention, tailpipe insertion means 80 is constructed in a tapered and pliable configuration to be expeditiously and sealably received in tailpipe 120E so that exhaust gases are properly sealed and so that smoke may be communicated from smoke-generation means 25 through connector hose 84 and then into and throughout exhaust system 100. It will become evident to those skilled in the art, that exhaust pipe insertion means 80 must be of hollow construction and should preferably be constructed in a frustoconical configuration to readily communicate smoke emanating from smoke-generating apparatus 25 with exhaust system 100. As will be described in detail with reference to FIGS. 1–4, this smoke is communicated from smoke-generating apparatus 25 and exhaust system 100 through hose 84 which is axially enclosed within tapered insertion means 80. As clearly depicted, in the preferred embodiment, tapered insertion means 80 is preferably frustoconically-shaped to achieve maximal sealing capability in common tailpipes known in the art. Of course, the insertion means contemplated under the present invention may be constructed in other suitable shapes to effectively sealably interconnect smoke-generating apparatus 25 and exhaust system 100 and to perform the functions herein elucidated.

Still referring now to FIGS. 1–4, tapered insertion means 80 should preferably be constructed from a suitable elastomeric material such as vulcanized rubber. As will be appreciated by practitioners in the art, such elastomeric materials should be selected for being abutably received into commonly-sized tailpipes and being able to withstand the concomitant high temperatures and the diversity of chemical impurities and the like that predictably are contained within exhaust gases from an internal combustion engine. For example, vulcanizate compound 30-002-45 is a neoprene rubber cured for at least 10 minutes at 300° F. and affording the following properties: 42 tensile sheet hardness, 440 modulous at 300° F., 2125 ultimate tensile, 670 ultimate elongation, 156 angle tear resistance, 1.04 specific gravity, 34.1% compression set shore hardness (22 hrs 212) and 28.3% (22 hrs 158).

It has been discovered that the selection of angle of the conical section significantly impacts its ability to quickly form an effective seal at the end of a diversity of tailpipes that are found on common automobiles, vans, trucks, etc. Thus, while a diversity of frustoconical configurations may be inserted into tailpipes with at least modest sealing capability, it has been found that a limited range of conical angles provide the prerequisite performance for precisely locating exhaust gas leaks in automobiles and the like. Under the present invention, the internal angle a of insertion means 80 should preferably be from 15° to 40° in order to adequately conform to the various tailpipes commonly found in automobiles and trucks, and to thus be conveniently inserted into and abutably received by such tailpipes, thereby reliably sealing the gas exhaust system being tested. If the slope of the sides of frustoconical plug 80 is less than 15° then too much of narrow portion 86 of plug 80 frequently must be inserted into the tailpipe in order to appropriately seat the plug and establish a seal preventing escape both of exhaust gas and smoke from the tailpipe. This not only typically consumes too much time for the plug-insertion step, but also tends to jeopardize the technician's safety because the hand inserting the plug tends to get uncomfortably close to the hot tailpipe surface.

If, on the other hand, the slope of the sides of frustoconical plug 80 is greater than 40° then the technician is frequently unable to sufficiently seat the plug into the tailpipe because wide section 88 of plug 80 tends to engage the interior surfaces of tailpipe before sufficient contact has been made therewith. Accordingly, an embodiment of the present invention constructed with a frustoconical plug having an internal angle a of greater than 40° is unlikely to provide an adequate tailpipe seal wherein both exhaust gases and smoke are contained therein so that exhaust leak detection may be performed as herein described. Indeed, it has been observed during extensive field testing using frustoconical insertion means having configurations beyond this preferred range of internal conical angles α from 15° to 40° that the integrity of the leak detection procedure described herein is seriously undermined; it should be clear to those skilled in the art that such an inadequate or unreliable seal will engender a disability locating the precise location of gas leaks throughout an exhaust system.

To conveniently and adequately conform to the various tailpipes commonly found in automobiles, vans and trucks, it has been found to be even more preferable for insertion means 80 to be constructed with internal angle α of from 20° to 30°; an internal angle α from 23° to 27° provides an even more suitable fit with tailpipes commonly encountered by practitioners in the field; and an internal angle α of 25° provides the best performance obtained under the teachings of the present invention. At this angle, for instance, a 3 inch diameter could be achieved in only a 5 inch length, which has been found to be adequate for accommodating the tailpipes of most cars, vans and trucks wherein the seal contemplated by the present invention is realized.

It has also been found that another crucial ingredient of a diagnostic exhaust gas procedure taught by the present invention is to promptly communicate the generated smoke with the exhaust system and, indeed, to enable such smoke to expeditiously permeate the exhaust system so that leaks therein may be accurately and reliably located. Thus, as the primary vehicle for entry of smoke into an exhaust system being tested, inlet hose 84 of cone insertion means 80 must have sufficient inside diameter to permit smoke to freely flow therethrough at a nominal rate of about 10 liters per minute. As is well known in the art, neoprene rubber is a common material of construction for automobile hoses and the like. Accordingly, it has been found that inside diameters of $5/16$ inch and $11/32$ inch are acceptable, but an inside diameter of at least $3/8$ inch is preferable to provide uninhibited smoke flow through hose 84 into exhaust system 100. It should be evident to those skilled in the art that smoke inlet hose adaptor 82 is correspondingly configured and sized to receive inlet hose 84. For example, a brass inlet of no less than $1/4$ inch inside diameter should preferably be used. Clamp 83 and the like may be used to secure hose 84 to receptacle 82.

Such an uninhibited flow rate has been found to be advantageous for preventing adverse effects of hot gas traveling through and exiting from an exhaust system as contemplated herein. Ergo, it has been learned that with a substantial restriction of the incursion of this smoke into an exhaust system, dissipation of the smoke is likely before the location of exhaust gas leaks may be ascertained. Thus, to accomplish the purposes contemplated by the present invention using smoke-generating apparatus 25 as will be hereinafter described in detail, not only must an adequate supply of high quality, sufficiently dense smoke be produced, but also this smoke must be delivered to an exhaust system at approximately 10 liters per minute so that the various components of a typical exhaust system may be readily permeated with such smoke whereby gas leaks may be immediately located with a precision heretofore unknown in the art. When this optimal, flow rate of smoke is diminished by one or more factors such as an imperfect seal between tailpipe 120E and insertion means 80, or using hoses of too small inside diameter, the smoke may fail to effectively permeate an inadequately closed exhaust system, i.e., an exhaust system having one or more gas leaks therein, such that the integrity of the detection method is significantly undermined. Furthermore, if a test for exhaust leaks consumes too much of a mechanic's time or perhaps of an anxiously-awaiting customer's time, it is unacceptable because such a procedure would be a disservice to the public: not only would labor costs become expensive, but also consumers would become irritated because of extended wait-times while such exhaust testing is being performed.

By thus communicating smoke through hose means 84, disposed axially within exhaust cone 80, and throughout exhaust system 100, through plurality of pipe means 120, telltale smoke emanating from one or more points in the exhaust system identifies the precise location of leakage therein. As will be hereinafter described, smoke contemplated by the present invention is communicated under pressure throughout exhaust system 100 and exhaust cone 80.

As depicted in FIGS. 1–4, according to the present invention, to test a particular internal combustion engine's exhaust system for leaks, its tailpipe is sealably and, of course, releasably interconnected with a specially designed combination of a frustoconically-shaped insertion means and connector-hose which, in turn, is interconnected with a conduit communicating pressurized leak-seeking smoke. No subordinate pipes and the like within the system need to be disconnected. Under the present invention, any and all exhaust leaks therein will be readily ascertained by the presence of smoke emanating therefrom. Regardless of the size of the leak in a exhaust system or in a concomitant connection, and regardless of the number of pipes and interconnections in a particular system, the method and apparatus of the present invention will conveniently and reliably locate the presence of leaks therein.

Referring to FIGS. 1–5, it is seen that tailpipe 120E and hose 84 are sealably interconnected through the joinder of insertion means 80 and tailpipe 120E. Hose 84 is sealably interconnected with conduit 22 disposed at spark-arrestor 3 of smoke-generating assembly 25.

Figure 5:
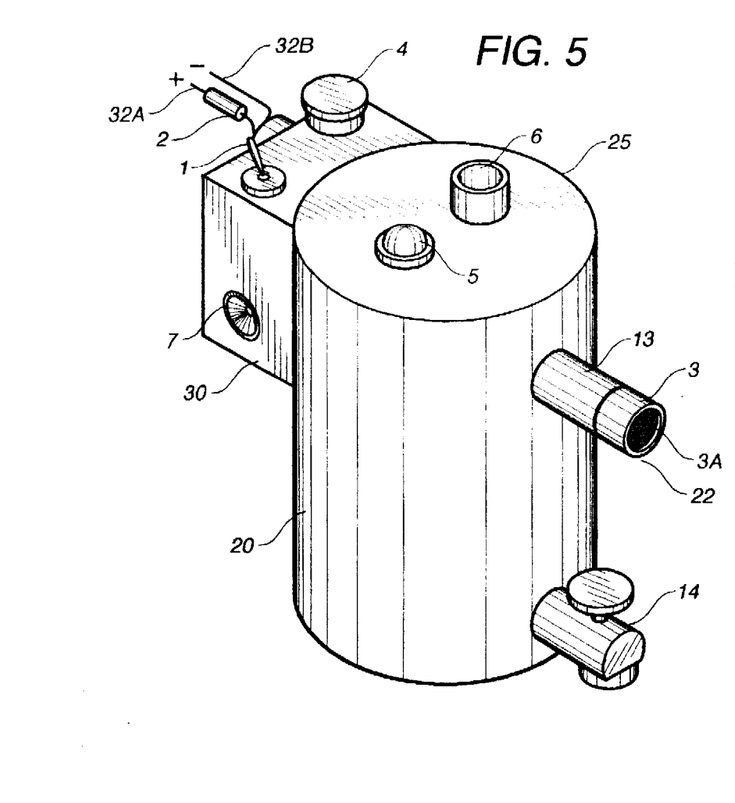
FIG. 5 depicts a frontal perspective view of a portion of an apparatus embodying the present invention.

FIG. 5 depicts a frontal perspective view of the preferred embodiment of smoke generating apparatus 25 for in situ leak detection according to the teachings of the present invention. More particularly, there is shown housing 30 fixedly attached to the upper side of chamber 20. In an alternate embodiment, housing 30 and chamber 20 are integrated into a single unit, preferably with a rectangular cross-section. Housing 30 has on-off switch 1 and pressure release dial 4 disposed on the top surface thereof, and air inlet 7 disposed on the front surface thereof. Chamber 20 has indicator light 5 and smoke generating fluid inlet 6 disposed on the top surface thereof. On the lateral surface of chamber 20, disposed oppositely of housing 30, are conduit 22 and smoke-generating fluid drain 14.

Figure 6:
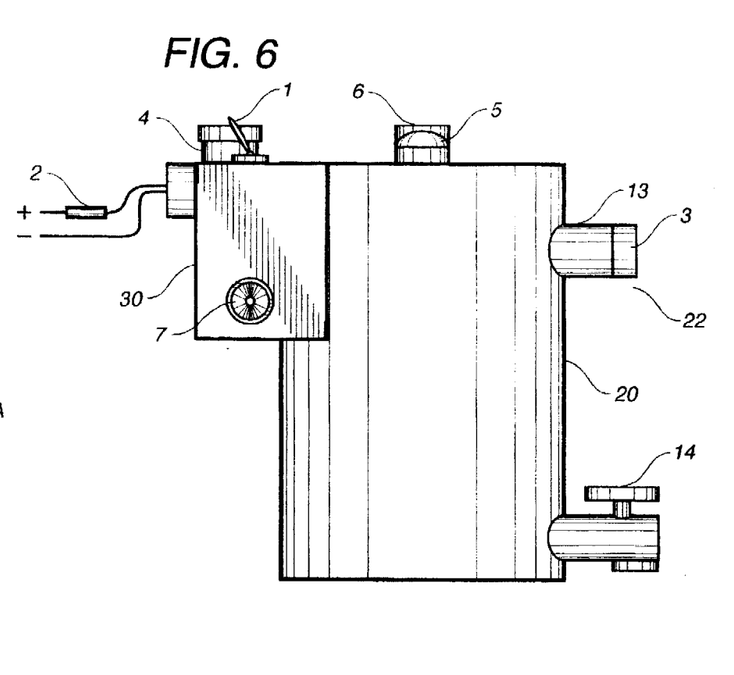
FIG. 6 depicts a front view of the apparatus depicted in FIG. 5.
Figure 7:
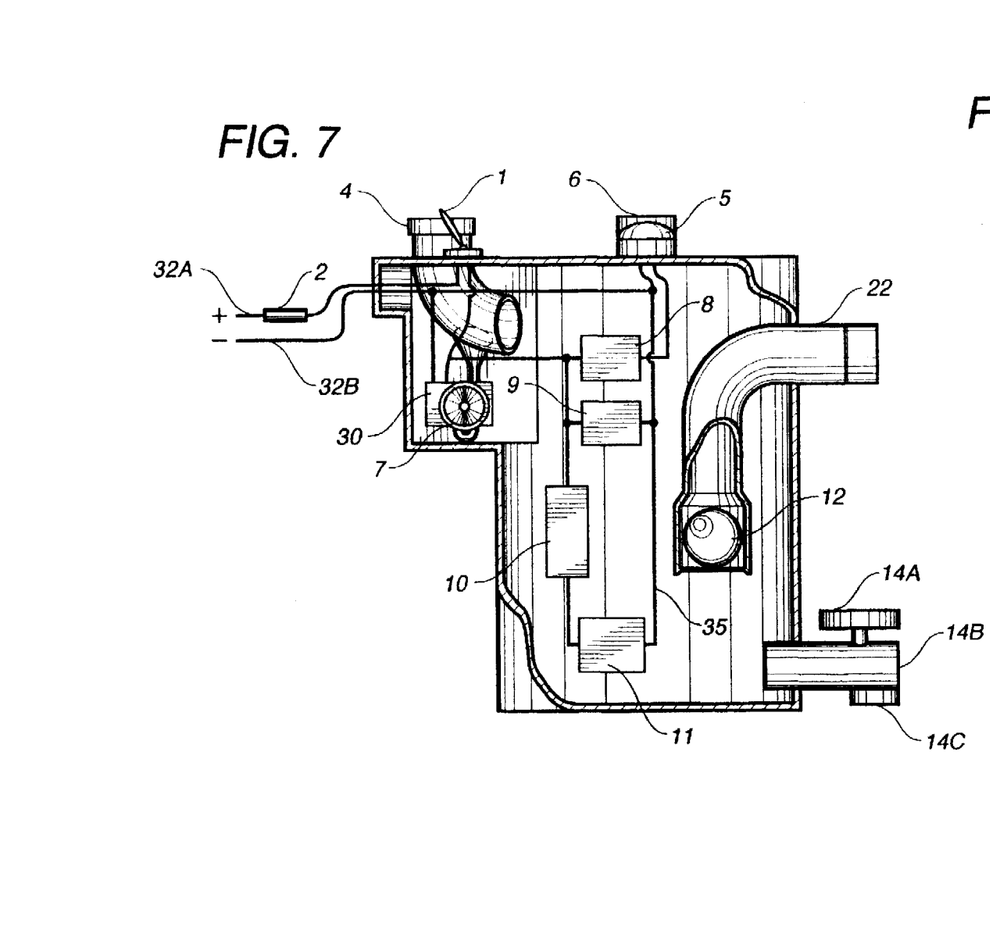
FIG. 7 depicts a front cut-away view of the apparatus depicted in FIG. 6.
Figure 8:
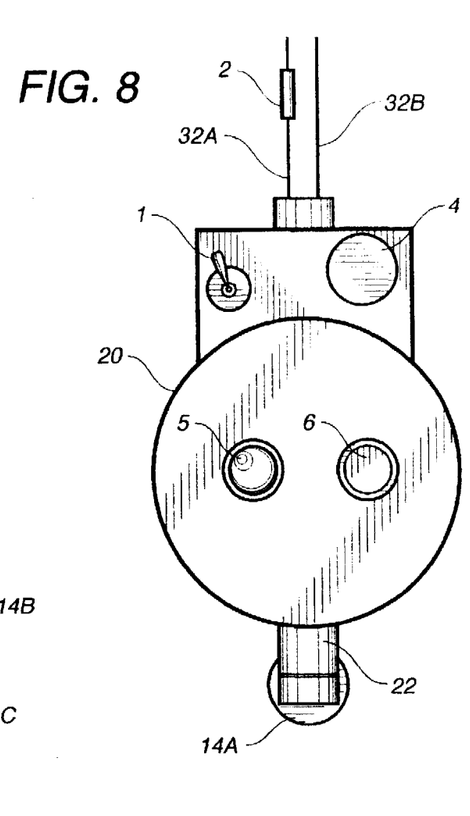
FIG. 8 depicts a top plan view of the apparatus depicted in FIG. 5.

Now referring to FIGS. 5–7, air inlet 7 filters incoming air before it reaches 12-volt bellows pump 15. As should be apparent to those skilled in the art, this prevents dirt and the like from contaminating the pump or otherwise impeding its normal operation. The flow of smoke-generating fluid is controlled by pressure adjustment knob 4 and drain 14. Pressure release knob 4, comprising a conventional ball valve, regulates the pressure manifest by the smoke generated within chamber 20. Thus, depending upon the particular closed system being tested for leaks, all of the pressure generated may not be necessary for testing, or may not be appropriate because of pressure constraints in the system being tested. By suitably rotating knob 4, the cooperating valve is caused to thereby release a proportional amount of pressurized vapor. Of course, knob 4 could be marked or calibrated to indicator specific pressure levels which could be useful for applying prescribed pressures to particular automotive systems.

To confirm that smoke is indeed being generated during the operation of the present invention, attention should preferably be directed to the output stream from conduit 22. In one method of operation, a main hose of the particular automotive system being tested for leaks, should not be connected to conduit 22 until smoke is observed exiting therefrom. In another method of operation, perhaps applicable under circumstances in which leaks appear to be nonexistent, the main hose connected to conduit 22 may be separated therefrom and smoke observed.

The smoke generating aspect of the present invention is known in the prior art, and is generally described by Fortney in U.S. Pat. No 3,250,723, by Dickman in U.S. Pat. No. 3,432;439, and by Swiatosz in U.S. Pat. No. 4,303,397. In accordance with the present invention, a smoke generating fluid is inserted into chamber 20 through filler port 6. Smoke generating fluid should preferably be non-flammable and non-toxic. For example, Bray Oil Company fireproof hydraulic fluid C-635 having a flash point of 425° F. may be used.

Referring to FIGS. 1 and 5–7, when switch 1 is moved into the "on" position, heating element 11 is activated. As the fluid contained within chamber 20 is heated sufficiently, smoke is generated and exits through conduit 22. Conduit 22 is interconnected with tailpipe 120E automotive exhaust system 100, through hose means 84, at spark-arrestor 3 of smoke-generating apparatus 25.

Now referring to FIG. 7, there is shown a cut-away frontal view of the embodiment of the present invention depicted in FIG. 5, in which assembly 35 for the smoke generating aspect is shown in a simplified, schematic view. Cable 32A is electrically connected to a positive terminal preferably of an automobile battery and the like. Fuse 2 is electrically interconnected with cable 32A, for safety purposes. Similarly, cable 32B is electrically connected to a negative terminal thereof.

Smoke generating assembly 35 includes pump 15, thermistor 8 spike-protecting diode 9, switch 10, and ceramic heating element 11. A smoke-producing fluid is poured into chamber 20 through filler port 6. In accordance with the preferred embodiment of the present invention, this fluid level should preferably cover approximately one-half of heating element 11. When fluid is being poured into chamber 20 through filler port 6, drain 14 should be in an "open" position. In particular, drain 14 cooperates with the level of smoke generating fluid such that when fluid starts to exit from drain port 14C, the optimal fluid level, as hereinbefore described, has been obtained. Accordingly, knob 14A is rotated to close a conventional ball valve, thereby closing drain 14B. Heating element 11 becomes sufficiently hot to cause the smoke-generating fluid to vaporize by coming into contact therewith. If the fluid level substantially exceeds the prescribed level relative to the height of heating element 11, whereby heating element becomes submerged, vaporization is prevented and the fluid is merely heated and eventually reaches its boiling point.

Referring again to FIGS. 5–7, according to the present invention, it is advantageous for housing 20 and chamber 30 to be insulated with a thin piece of slate and the like, and to be constructed from finned aluminum to dissipate heat thereby minimizing the risk of injuring the operator or damaging the automobile. As is well known in the art, the finning promotes this heat transfer because it tends to maximize surface area of the container. It is also advantageous for heating element 11 to be attached abuttably to the bottom of chamber 30. This, of course, minimizes the requisite smoke-generating fluid that must be filled into chamber 30 to reach the preferable ½-way point on heating element 11. In accordance with the preferred embodiment, approximately fluid one inch high is sufficient to generate smoke for leak detecting purposes.

Turning switch 1 to the "on" position illuminates light 5, activates pump 15 whereby the fluid contained in chamber 20 is circulated, and also activates heating element 11.

Figure 11:
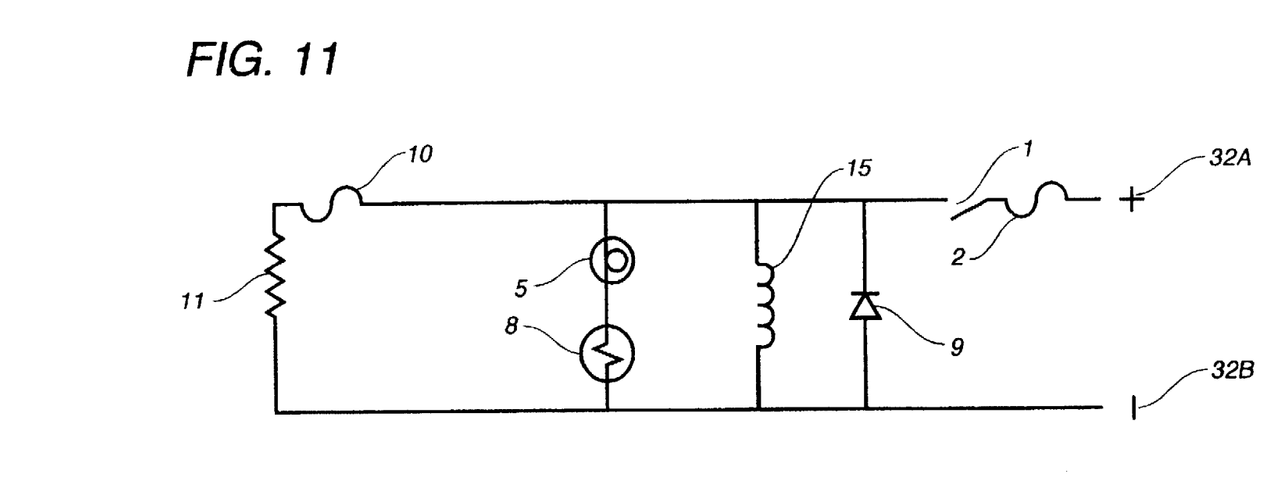
FIG. 11 depicts a simplified schematic diagram of the electrical circuit embodying the present invention.

Specifically referring to FIGS. 7 and 11, it is seen that switch 1, air pump 15, indicator light 5, and heating element 11 are included in an electrical circuit contained within chamber 30. The electrical circuit depicted therein further includes heating components thermistor 8, spike protector 9, bimetallic strip 10, and, of course, heating element 11. In a preferred embodiment of the present invention, heating element 11 consists of a conventional 3-ohm ceramic resistor heater.

In conjunction with the use of the hereinbefore described smoke-generating fluid, thermistor 8 is preferably preset to about 220° F. and senses the temperature in chamber 30. Part number TS6642 manufactured by Echlin Inc. of Bradford, Conn., is a representative thermistor which may be incorporated into the preferred embodiment. Referring again to FIGS. 7 and 11, when the chamber temperature reaches 220° F., thermistor 8 "closes" and enables current to flow to indicator light 5. This, of course, provides a visual indication that the smoke-generating fluid is being heated according to the methodology taught by the present invention.

In accordance with the preferred embodiment of the present invention, bimetallic strip 10 interrupts the heating action of heating element 11 preferably when the temperature in chamber 30 reaches approximately 250° F. Bimetallic strip 10 preferably maintains the temperature of the smoke-generating fluid in the temperature range 240° to 250° F. As should be clear to those skilled in the art, the reset temperature for thermistor 8 and the preferable temperature range within chamber 30, which is regulated by bimetallic strip 10, is a function of the physical properties of the particular smoke-generating fluid selected.

In accordance with the preferred embodiment, spike-protecting diode 9 prevents transient voltage from insulting a vehicle's electrical system. An illustrative spike-protector diode which may be incorporated into the preferred embodiment is General Electric part number IN4001 corresponding to a 1 amp diode rated with peak inverse voltage of 100. As is well known to those skilled in the art, since transient voltages may be generated in an internal combustion engine, there is tendency to cause corresponding electrical voltage surges therein. Accordingly, the spike-protector diode conveniently "opens" the positive side of the electrical circuit, thereby enabling the transient to feed back through its negative side to ground.

As should be apparent to those skilled in the art, the hereinbefore described electrical devices are secured to the walls, or the like, of housing 20 or chamber 30 by fixedly attaching them thereto in a convenient position. The wiring within housing 20 or chamber 30 is grounded through negative wire and not to the metal housing or chamber. This is to prevent the instant apparatus from being disabled if positive wire lost its insulation or if internal wiring lost insulation, and then contacted the metal walls.

Figure 9:
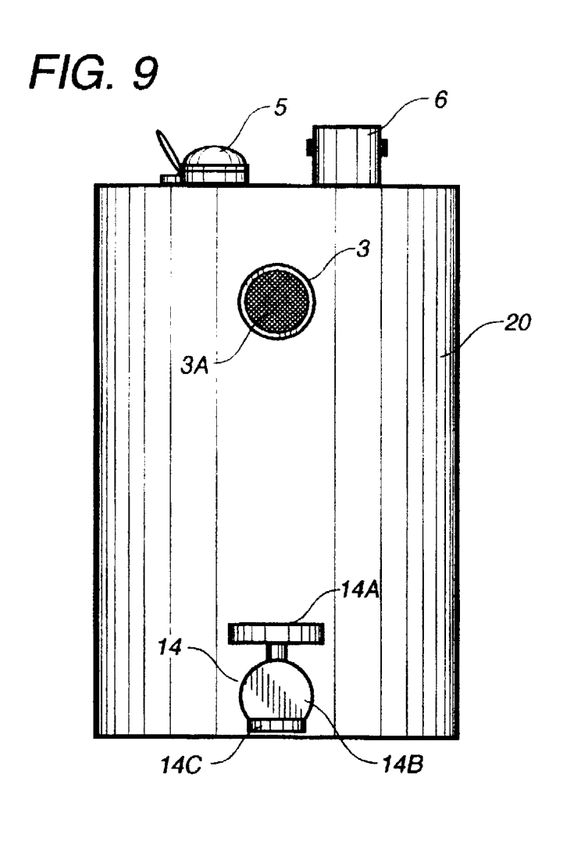
FIG. 9 depicts a right side view of the apparatus depicted in FIG. 5.
Figure 10:
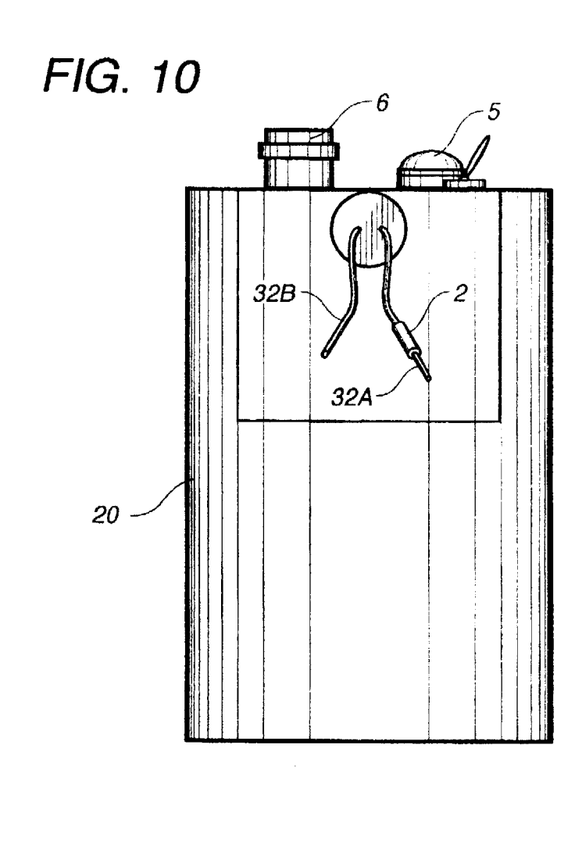
FIG. 10 depicts a left side view of the apparatus depicted in FIG. 5.

Another protection against invasion of a vehicle's closed exhaust system is spark-arrestor 3 which is disposed at the remote end of conduit 22 as an interface with the vehicle's internal combustion engine. A typical spark-arrestor is part number 2994 of Echlin Inc. of Bradford, Conn. As should be clear to those skilled in the art, spark-arrestor 3 prevents sparks or even flames from entering a vehicle's engine, thereby causing an explosion. Flames could be generated, for example, if a flammable fluid mixture was inadvertently created in chamber 20. Referring now to FIGS. 5 and 9, there is seen filter 3A disposed orthogonally at the end of spark-arrestor 3, and screwably attached thereto, to prevent contaminants, impurities, coagulants, etc., from entering the internal combustion engine therethrough. Referring now to FIG. 7, there is depicted check ball valve 12 which prevents fluid from exiting the vehicle's system through a vacuum hook-up hose, if chamber 30 is inadvertently inverted or even over-filled. As should be apparent to those skilled in the art, a hydrostatic lock and the like is prevented by a plastic ball being forced against a tapered tube within the lower portion of conduit 22. The specific gravity of the plastic ball, which preferably can withstand temperatures as high as 300° F., is selected to be greater than the specific gravity of the smoke-generating fluid residing within chamber 30. Accordingly, during normal operation of the present invention, ball valve 12 rests upon the surface of the smoke-generating fluid and is disposed in an "open" position, thereby permitting the generated smoke to pass through conduit 22 into the exhaust system connected thereto for leak testing purposes. Otherwise, ball valve 12 safeguards the integrity of the engine from any kind of inadvertent error in orientating an embodiment of the present invention with respect to the engine being tested for leaks.

Thus, in accordance with the present invention, to test a particular exhaust system for leaks, preferably a frustoconical insertion means is used to form a seal between the tailpipe and the outlet from a smoke-generation apparatus, whereby smoke travels through an interconnecting hose and permeates the exhaust system. No pipes and the like within the exhaust system need to be disconnected. Under the present invention, any and all exhaust leaks therein will be readily ascertained by the presence of smoke emanating therefrom. Regardless of the size of the leak in a component, pipe, or concomitant connection, the method and apparatus of the present invention will conveniently and reliably locate the presence of leaks therein.

As is known to those skilled in the art, leaks in exhaust systems of internal combustion engines adversely affect performance, jeopardize the safety of passengers, and pollute the environment. In view of the emissions control standards and procedures adopted by the United States Environmental Protection Agency, exhaust leaks from automobiles and the like are no longer acceptable. The present invention enables each and every leak from automobile exhaust systems to be located with a precision and reliability heretofore unknown in the art.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the concept of the present invention is to be measured by the scope of the appended claims herein.

The invention claimed is:

1. An apparatus for detecting, with a smoke-generating fluid, leaks in an exhaust system contained in a vehicle powered by an internal combustion engine having a plurality of pipes including a tailpipe, flanges, gaskets, and clamps, and further having an energizing battery, said apparatus comprising:

chamber means for containing said smoke-generating fluid;

said chamber means including port means for pouring said smoke-generating fluid and circulation means for circulating said smoke-generating fluid therein;

switch means fixedly attached to an internal surface of said chamber means and electrically coupled to said battery, for starting and stopping the operation of said apparatus;

heating means fixedly attached to an internal surface of said chamber means and electrically coupled to said switch means and responsive thereto, for vaporizing said smoke-generating fluid into smoke;

temperature regulating means fixedly attached to an internal wall of said chamber means and electrically coupled to said heating means, for regulating the operation of said heating means;

pressure regulating means fixedly attached to said chamber means for regulating the pressure of said smoke within said chamber means; and conduit means fixedly attached to said chamber means and configured to sealingly communicate said smoke to said exhaust system through a hollow tapered insertion means having hose means disposed axially within said insertion means and sealably interconnected with said tailpipe and said conduit means, and also having a frustoconically-shaped elastomeric material configured to be abutably received by said tailpipe and configured with an internal conical angle of from 20° to 30° adjoined to said tailpipe for detecting said exhaust leaks and their location by visibly discerning smoke exiting from said exhaust system at the various locations of said tailpipe, said flanges, said gaskets and said clamps into the atmosphere.

2. The apparatus recited in claim 1, wherein said chamber means comprises fluid flow regulating means fixedly attached to an internal wall of said chamber means, for preventing the inadvertent flow of said smoke-generating fluid through said conduit means.

3. The apparatus recited in claim 2, wherein said fluid flow regulating means comprises first valve means fixedly inserted into said conduit means, disposed transversely thereof.

4. The apparatus recited in claim 1, wherein said chamber means is constructed with a finned material to enable heat generated therein to be rapidly dissipated therefrom.

5. The apparatus recited in claim 1, wherein said chamber means includes insulating means abuttably disposed thereebeneath for preventing heat related damage to the operator or to the surface of said vehicle.

6. The apparatus recited in claim 1, wherein said conduit means comprises spark-arrestor regulating means, for preventing flashback or inadvertent ignition in said internal combustion engine.

7. The apparatus recited in claim 1, wherein said heating means comprises resistor heater means.

8. The apparatus recited in claim 1, wherein said heating means is abuttably disposed on the bottom of said chamber means.

9. The apparatus recited in claim 1, wherein said heating means is partially immersed in said smoke-generating fluid within said chamber means to enable vaporization thereof into said smoke by said smoke-generating fluid contacting the immersed portion of said heating means.

10. The apparatus recited in claim 1, wherein said circulating means comprises air pump means.

11. The apparatus recited in claim 10, wherein said pumping means further comprises filter means to prevent dirt and dust from being ingested thereinto.

12. The apparatus recited in claim 1, wherein said pressure regulating means comprises second valve means for venting excess smoke from said chamber means into the ambient air.

13. The apparatus recited in claim 1, wherein said pressure regulating means comprises discharge means for removing excess smoke-generating fluid from said chamber means.

14. The apparatus recited in claim 1, wherein said temperature regulating means comprises bimetallic strip means for maintaining the temperature of said smoke within a prescribed range.

15. The apparatus recited in claim 1 wherein said chamber means includes illumination means, for indicating that heating is in progress, electrically coupled to said switch means with thermistor means, and activated when a predetermined temperature is reached in said thermistor means.

16. The apparatus recited in claim 1, wherein said chamber means includes spike protection means for preventing voltage surges from damaging said internal combustion engine.

17. The apparatus recited in claim 1, wherein said hollow tapered insertion means comprises hose means disposed axially within said insertion means and sealably interconnected with said tailpipe and said conduit means.

18. The apparatus recited in claim 17, wherein said hollow tapered insertion means comprises a frustoconically-shaped elastomeric material configured to be abutably received by said tailpipe.

19. The apparatus recited in claim 1, wherein said frustoconically-shaped insertion means has an internal conical angle of from 23° to 27°.

20. An apparatus for detecting, with a smoke generating fluid, leaks in an exhaust system contained in a vehicle powered by an internal combustion engine having a plurality of pipes including an exhaust pipe, gaskets, flanges and clamps and further having an energizing battery, said apparatus comprising;

chamber means for containing said smoke-generating fluid;

said chamber means comprising port means for pouring said smoke-generating fluid, pump means for circulating said smoke-generating fluid therein, and illumination means for indicating that heating is in progress;

fluid flow regulating means fixedly attached to an internal wall of said chamber means, for preventing the inadvertent flow of said smoke-generating fluid through said conduit means;

switch means fixedly attached to an internal surface of said chamber means and electrically coupled to said battery, for starting and stopping the operation of said apparatus;

spike protection means fixedly attached to an internal wall of said chamber means and electrically coupled to said battery, for preventing voltage surges from damaging said internal combustion engine;

said illumination means electrically coupled to said switch means with thermistor means, and activated when a predetermined temperature is reached in said thermistor means;

heating means fixedly attached to an internal surface of said chamber means and electrically coupled to said switch means and responsive thereto, for vaporizing said smoke-generating fluid into smoke;

said heating means partially immersed in said smoke-generating fluid within said chamber means to enable vaporization thereof into said smoke by said smoke-generating fluid contacting the immersed portion of said heating means;

temperature regulating means fixedly attached to an internal wall of said chamber means and electrically coupled to said heating means, for regulating the operation of said heating means;

pressure regulating means fixedly attached to said chamber means for regulating the pressure of said smoke within said chamber means; and conduit means fixedly attached to said chamber means and configured to sealingly communicate said smoke to said exhaust system through a hose means disposed axially within a hollow tapered insertion means and sealably interconnected with said tailpipe and said conduit means;

said hollow tapered insertion means configured with a frustoconically-shaped elastomeric material having an internal conical angle of 20° to 30°, and said hollow tapered insertion means adjoined to said tailpipe for detecting said exhaust leaks and their location by visibly discerning smoke exiting from said exhaust system at the various locations of said tailpipe said flanges, said gaskets and said clamps into the atmosphere; with said conduit means including spark-arrestor regulating means for preventing flashback or inadvertent ignition in said internal combustion engine.

21. The apparatus recited in claim 20, wherein said fluid flow regulating means comprises first valve means fixedly inserted into said conduit means disposed transversely thereof.

22. The apparatus recited in claim 20, wherein said chamber means is constructed with a finned material to enable heat generated therein to be rapidly dissipated therefrom.

23. The apparatus recited in claim 20, wherein said heating means comprises resistor heater means.

24. The apparatus recited in claim 20, wherein said pressure regulating means comprises second valve means for venting excess smoke from said chamber means into the ambient air.

25. The apparatus recited in claim 20, wherein said pressure regulating means comprises discharge means for removing excess smoke generating fluid from said chamber means.

26. The apparatus recited in claim 20, wherein said temperature regulating means comprises bimetallic strip means for maintaining the temperature of said smoke within a prescribed range.

27. The apparatus recited in claim 20, wherein said hollow tapered insertion means comprises a frustoconically-shaped elastomeric material having an internal conical angle of from 23° to 27°.

* * * * *